March 3, 1959 A. H. FAULKNER 2,876,289
TRANSLATOR FOR A TELEPHONE SYSTEM
Filed Aug. 1, 1956
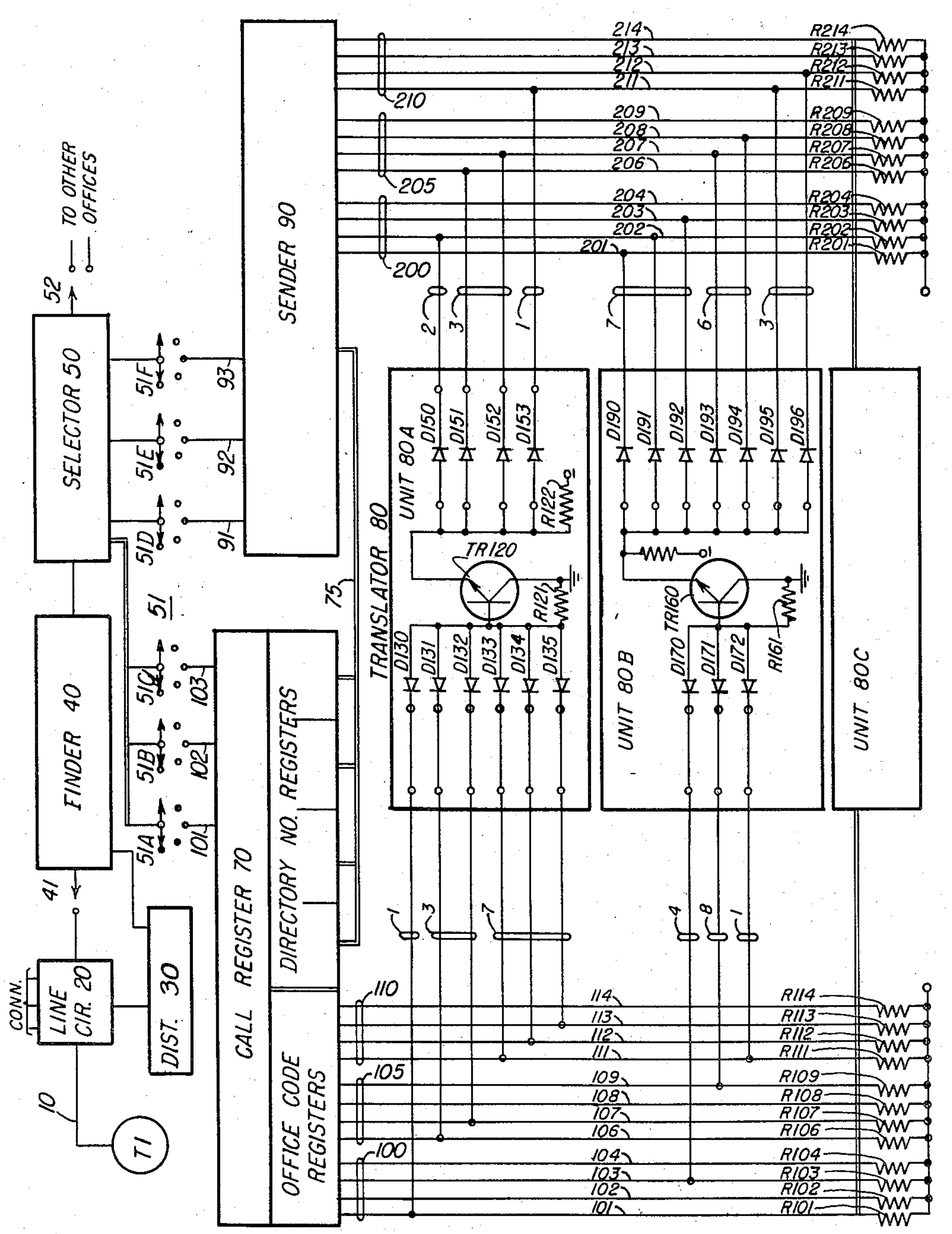
INVENTOR.
Alfred H. Faulkner
BY
Smith, Olsen, Baird and Miller
Attys.

United States Patent Office 2,876,289

Patented Mar. 3, 1959

2,876,289

TRANSLATOR FOR A TELEPHONE SYSTEM

Alfred H. Faulkner, Chicago, Ill., assignor to General Telephone Laboratories, Incorporated, a corporation of Delaware Application August 1, 1956, Serial No. 601,467

4 Claims. (Cl. 179—18)

The present invention relates to telephone systems employing register-senders and particularly to translators for use in conjunction with the register-senders thereof.

It is an object of the present invention to provide an improved translator having reduced power requirements and being compact in size.

A further object of the invention is to provide an improved translator that is entirely electronic.

An additional object of the invention is to provide an improved translator employing semi-conductive devices including diodes and transistors.

Further features of the invention pertain to the particular arrangement of circuit elements in the translator of the telephone system, whereby the above outlined objects and additional operating features thereof are attained.

The invention both as to its organization and method of operation, taken together with the further objects and advantages thereof, will be best understood by reference to the following specification taken in conjunction with the accompanying drawing which illustrates the telephone apparatus of a calling office provided with a translator in accordance with the invention.

Referring specifically to the drawing, the calling office as illustrated serves a plurality of subscriber lines, including the subscriber line 10 extending to the subscriber station T1. The calling office also includes a plurality of line circuits respectively terminating the subscriber lines and includes the line circuit 20 terminating the subscriber line 10. In addition, the office comprises a distributor 30 operatively connected to the line circuits therein and to a plurality of finder-primary selector groups. The finder-primary selector group illustrated includes the finder 40 and the primary selector 50 of which the finder 40 includes a wiper set 41 having access to the line circuits 20, etc., and the primary selector 50 includes a wiper set 51 having access to a plurality of register-translator-sender groups and includes a wiper set 52 having access to trunks extending to distant telephone offices. The wiper sets 41 and 52 may be of the Strowger type, whereas the wiper set 51 may be of the conventional rotary type.

Referring specifically to the primary selector 50, the apparatus included therein is of conventional arrangement and adapted to receive digits from the calling subscriber station, to transfer these digits to an idle register-translator-sender group, to receive therefrom control signals for operating the wiper set 52 thereof in order to select an outgoing trunk and to transmit thereover further control signals for operating switching apparatus to extend a connection to the called subscriber station in the distant office. Thereafter, the register-translator-sender group is released from the primary selector 50 and the calling subscriber station is connected through the primary selector to the called subscriber station. The wiper set 51 of the primary selector 50 includes, as illustrated, the wipers 51A, 51B, 51C, 51D, 51E and 51F, operable from the primary selector 50 to rotate step by step in a counter-clockwise direction across associated contacts in order to select an idle register-translator-sender group over the wiper 51C, thereafter to transmit digits over the wipers 51A and 51B to the selected register, to receive switching control signals from the selected sender over the wipers 51E and 51F, and to receive a release control from the selected sender over the wiper 51D whereby the selected register-translator-sender group is released and restored and the selector 50 connects the calling station T1 through to the called station.

The register-translator-sender groups each comprise as illustrated in the drawing, a calling register 70, a translator 80, and a sender 90, of which the calling register 70 may be of the type disclosed in the copending application to A. H. Faulkner, Serial No. 601,468, filed August 1, 1956, and includes a group of three office code registers and a group of four directory number registers. The office code registers are connected through the individual code translator units 80A, 80B, 80C, etc., corresponding to the number of different switching routes available to the calling stations of the translator 80 to the sender 90, and the directory number registers are connected via the trunk 75 to the sender 90.

The calling register 70 is accessible to the primary selector 50 over the conductors 101, 102, and 103, and the sender 90 is accessible to the primary selector 50 over the conductors 91, 92 and 93.

The office code digits received in the calling register 70 are respectively registered in the office code registers thereof on a binary basis and are marked accordingly to groups of conductors 100, 105 and 110, respectively, corresponding to the office code registers, whereof the group 100 includes the conductors 101, 102, 103 and 104 terminated at negative battery (—48 volts) via resistors R101, R102, R103 and R104, respectively, and the group 105 includes the conductors 106, 107, 108 and 109 terminated at negative battery via resistors R106, R107, R108 and R109, respectively, and the group 110 includes the conductors 111, 112, 113 and 114 terminated at negative battery via resistors R111, R112, R113 and R114, respectively.

Each of the code translator units, such for example, as the code translator unit 80A, includes a transistor TR120 connected in a grounded collector circuit, a plurality of blocking diodes D130, D131, D132, D133, D134 and D135 connected between the base electrode thereof and a selected one or ones of the conductors in each of the groups 100, 105 and 110, and a plurality of blocking diodes D150, D151, D152 and D153 connected between the emitter electrode and a selected one or ones of the conductors in each of a group of conductors 200, 205, 210 extending to the sender 90. The group of conductors 200 includes the conductors 201, 202, 203 and 204 which are connected to negative battery (—48 volts) via resistors R201, R202, R203 and R204, respectively; the group of conductors 205 includes the conductors 206, 207, 208 and 209 which are connected to negative battery via resistors R206, R207, R208 and R209, respectively; and the group of conductors 210 includes the conductors 211, 212, 213 and 214, which are connected to negative battery via resistors R211, R212, R213 and R214, respectively. As will be explained in detail hereinafter, the selective markings on the conductors of the group 100, 105 and 110 cause one of the code translator units 80A, etc., to be operated so that the transistor thereof conducts and causes the conductors of the groups 200, 205 and 210 to be selectively marked.

The sender 90, which may be of the type disclosed in the copending application to A. H. Faulkner, Serial No. 601,465, filed August 1, 1956, is operated in accordance with the markings on the conductors of the groups 200, etc., to send corresponding routing digits to the selector 50 whereupon the selector 50 and the switching apparatus accessible therefrom are operated to select a trunking route to the called station. Thereafter the sender 90 is operated over the trunk 75 to cause the directory number digits stored in the directory number registers of the call register 70 to be transmitted over the selected trunking route.

The operation of the translator 80 in accordance with the invention will be better understood by considering a call initiated at the subscriber station T1 to be extended to a subscriber station in a distant office, and the disposal of that call in the telephone system.

Now assuming that a call is initiated at the subscriber station T1 to be extended to a subscriber station in a distant exchange, the line circuit 20 is operated to mark the subscriber line 10 as calling to the finder-selector groups having access thereto and to mark the subscriber line 10 as busy to connectors having access thereto. Additionally, the line circuit 20 operates the distributor 30 to cause a finder in an idle finder-selector group, for example, such as the finder 40, to locate the subscriber line 10 marked as calling thereto. At the same time the finder 40 is operated by the distributor 30, the primary selector 50 associated therewith operates to cause the wiper set 51 to complete a connection to an idle register-translator-sender group. Specifically, the wiper 51C is rotated step-by-step in a counterclockwise direction over its associated contacts until it completes a connection to a conductor having battery potential thereon. Assuming that the conductor 103 is the first control conductor having battery potential marked thereon, the wiper 51C engages the contact terminating the control conductor 103 and the other wipers 51A, etc., of the wiper set 51 complete connections to the corresponding contacts thereof. When the finder 40 seizes the calling subscriber line 10, a connection is completed from the subscriber station T1 through the finder 40 and the primary selector 50 to the call register 70 whereby the call register is activated and dial tone is returned to the calling station T1.

Thereafter, the party at the calling subscriber station T1 receives dial tone and proceeds to dial the called number. For purposes of illustration it is assumed that the called number is composed of seven (7) digits of which the first three (3) digits are the office code digits identifying the distant office in which the called subscriber station is located and the last four (4) digits are the directory number digits identifying the subscriber station to the called office. Now, assuming that the party at the calling station T1 dials a number of which the first three digits (the office code digits) are "137," the calling register 70 is operated, in a manner as described in the copending Faulkner application, Serial No. 601,468, filed August 1, 1956, to register the digits 137 in the office code registers thereof and to mark the registered numbers respectively to the A, B, C and D conductors in the groups of conductors 100, 105 and 110 in accordance with the following table:

| Digit Value | Marking Voltages | | | |
|---|---|---|---|---|
| | Conductor A | Conductor B | Conductor C | Conductor D |
| 1 | 0 | −48 | −48 | −48 |
| 2 | −48 | 0 | −48 | −48 |
| 3 | 0 | 0 | −48 | −48 |
| 4 | −48 | −48 | 0 | −48 |
| 5 | 0 | −48 | 0 | −48 |
| 6 | −48 | 0 | 0 | −48 |
| 7 | 0 | 0 | 0 | −48 |
| 8 | −48 | −48 | −48 | 0 |
| 9 | 0 | −48 | −48 | 0 |
| 0 | −48 | 0 | −48 | 0 |

Accordingly, in the group 100, the conductor 101 is at ground potential and the conductors 102, 103 and 104 are at —48 volts, thereby registering the digit "1" in the group 105, the conductors 106 and 107 are at ground potential and the conductors 108 and 109 are at —48 volts, thereby registering the digit "3"; and in the group 110 the conductors 111, 112 and 113 are at ground potential and the conductor 114 is at —48 volts, thereby registering the digit "7."

The groups of conductors 100, 105 and 110 extend to a plurality of code translator units in the translator 80 corresponding to the number of different distant offices to which the calling station T1 has direct dialing access and wherein the registered office code digits are translated to routing digits for controlling the selector 50 and the switching apparatus accessible thereto.

Considering now the operation of the code translator units, and specifically the code translator unit 80A, the transistor TR120, which is preferably a N–P–N junction type and is connected in a grounded collector configuration, normally has its base and emitter electrodes established at approximately —40 volts by a circuit extending from ground potential via resistor R121 to the base electrode and thence via any one of the diodes D130, D131, D132, D133, D134 and D135 to selected ones of the negative battery biased conductors of the groups 100, 105 and 110. The emitter electrode is connected to the diodes D150, D151, D152 and D153 extending to the groups of conductors 200, 205 and 210 and is connected also to negative battery via a resistor R122 so that the diodes D150, etc., and the respectively connected conductors in the group 200, 205 and 210 are at approximately —40 volts. In the present example, the diode D130 is connected to conductor 101; diode D131 is connected to conductor 106; diode D132 is connected to conductor 107; diode D133 is connected to conductor 111; diode D134 is connected to conductor 112, and diode D135 is connected to conductor 113. Accordingly, when the office code digits "137" are registered on the conductor groups 100, 105 and 110 the diodes D130, etc., are biased nonconductive by ground potential on the connected conductors 101, etc.

Thereupon the base electrode of TR120 is established at substantially ground potential and the emitter electrode thereof follows so that the diodes D150, etc., and the conductors of the groups 200, 205 and 210 connected thereto are established at ground potential. In this manner routing digits are marked to the sender 90 in accordance with the above charted schedule. In the present example the diode D150 is connected to conductor 202; diode D151 is connected to conductor 206; diode D152 is connected to conductor 207; and diode D153 is connected to conductor 211; whereby these conductors are established at ground potential so that the routing digits "231" are marked to the sender 90. Thereafter the sender 90 sends the digits "231" and the directory number digits registered in the directory number registers of the calling register 70 and sends an "end of send" pulse to the selector 50 whereby the calling register 70 and sender 90 are released in the manner as described in detail in the copending application, Serial No. 601,465, filed August 1, 1956, of A. H. Faulkner. Thereupon the ground potential markings on the conductors of the groups 100, 105 and 110 are removed and the diodes D130, etc., are again rendered conductive thereby establishing base and emitter electrodes of TR120 at approximately —40 volts and removing the routing digit markings from the conductors of the groups 200, 205 and 210. At this time the register-translator-sender group is completely released and restored and is available to any other selector having access thereto.

Now assuming at the completion of the above described call the party at the station T1 initiates another call so that the calling register 70 and sender 90 and the associated translator 80 are seized, this call being directed to a distant office identified by the office code digits "481." At this time and prior to the dialling of the called number the translator 80 is in its restored state so that in the code translator unit 80A the emitter electrode of TR120 is maintained at approximately —40 volts, in a manner as previously explained, and in the code translator unit 80B the emitter electrode of the transistor TR160 is maintained at approximately —40 volts, in a similar manner. Specifically the transistor TR160 is connected in a grounded collector configuration and the base electrode (and accordingly the emitter electrode) is biased at approximately —40 volts by a connection thereto from ground potential via resistor R161 and by a connection therefrom via diodes D170, D171 and D172 to the negative battery biased conductors 103, 109 and 111.

Thereafter the party at the subscriber station T1 dials the called number including the office code digits 481 and the digits are registered in the calling register 70 so that in the group 100 only the conductor 103 is at ground potential, in the group 105 only the conductor 109 is at ground potential, and in the group 110 only the conductor 111 is at ground potential; the remainder of the conductors in the groups being at —48 volts.

At the completion of the registration of the office code digits "481" in the calling register 70 the operating state of the code translator unit 80A remains unchanged because only one of the diodes D130, etc., is biased nonconductive; but in the code translator unit 80B the diodes D170, D171 and D172 are biased nonconductive by ground potential marked to the conductors 103, 109 and 111. Accordingly, the base and emitter electrodes of TR160 are at substantially ground potential and the diodes D190, D191, D192, D193, D194, D195 and D196 connected between the emitter electrode, and selected ones of the conductors of the groups 200, 205 and 210 are established at substantially ground potential. The diodes D190, etc., are connected in the groups 200, 205 and 210 in accordance with the previously charted schedule so that at this time the routing digits "763" are marked to the sender 90.

Thereupon, and as previously mentioned, the sender 90 sends the digits "763" and the registered directory number digits followed by an "end of send" pulse to the selector 50; whereby the calling register 70 and sender 90 are released and the markings are removed from the groups of conductors 100, 105 and 110 thereby establishing the base and emitter electrodes of TR160 at approximately —40 volts and removing the routing digit marking from the conductors of the group 200, 205 and 210. At this time the register 70, the sender 90 and the translator 80 are all released and restored and made available to any other selector having access thereto.

From the foregoing explanation it is clear that a code translator unit may be arranged to be responsive to any combination of office code digits and to mark to the sender any desired routing digit or groups thereof. It is to be understood that in a system where registering is accomplished on a binary basis the use of one office code digit combination may necessarily exclude the use of another office code digit combination. For example, the use of office code digit combination "137" excludes the use of a group of office code digit combinations including "534" because the conductors in the groups 100, 105 and 110 marked in registering "137" include the conductors that would be marked in registering "534." However, in a system where registering is accomplished on a straight decimal basis no such limitation would be experienced.

While the marking of the routing digits to the groups of conductors 200, 205 and 210 is illustrated as being accomplished through a plurality of diodes, such, as in the code translator unit 80A, as the plurality of diodes D150, etc., the same marking may be accomplished through a single diode connected in common to the selected conductors in the groups 200, 205 and 210. It is understood that the translator 80 may also be adapted to convert office code digit markings of a binary nature to routing digit markings of a decimal nature, to convert office code digit markings of a decimal nature to routing digit markings of a binary nature, or to translate office code markings of a decimal nature to routing digit markings of a decimal nature.

In view of the foregoing, it is apparent that there has been provided a translator of improved arrangement that is entirely electronic and utilizes semi-conductive devices including crystal diodes and transistors.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a translator arrangement comprising a plurality of semiconductor switching devices, a first and a second group of marking conductors, an "and" gate connected to the input of each said semiconductor switching device, each said gate having a plurality of input leads, the input leads of each "and" gate being connected in different predetermined patterns to said first-group marking conductors, each of said semiconductor devices also having a plurality of output leads connected in parallel relationship to the output of its device, the output leads of each said device being connected in predetermined patterns to said second-group marking conductors, means for applying potential markings to certain ones of said first-group marking conductors in accordance with a first combinational code, the particular one of said devices all of whose input leads are thus marked being changed, responsive to the corresponding operation of its "and" gate, from one conductivity state to another for applying a marking by way of its output leads to said second-group marking conductors in accordance with a combinational code different from said first mentioned code.

2. In a telephone system, the arrangement as set forth in claim 1 wherein there is interposed in each of said output leads of said semiconductor switching devices a feedback preventing diode.

3. In a telephone system, a register-translator-sender arrangement, said register comprising means for receiving and registering a sequential series of decimal digital impulses, and comprising a plurality of marking conductors, a combinational code marking being applied by said register to certain ones of said marking conductors in accordance with said sequential series of decimal digits, said translator comprising semiconductor switching means having a plurality of input and output conductors, each of said input conductors being connected to a predetermined one of said marking conductors, said semiconductor switching means being changed from one conductivity state to another to apply, under the control of the markings on said input conductors, a combinational code marking different from said first-mentioned code marking to said output conductors, said sender being connected to said output conductors and comprising means for transmitting, responsive to the markings on said output conductors, a sequential series of decimal digital impulses different from but dependent upon said first series of decimal digits.

4. In a telephone system, the arrangement as set forth in claim 3 wherein said input conductors form part of an "and" gate connected to the input of said semiconductor switching device.

References Cited in the file of this patent

UNITED STATES PATENTS

| | | |
|---|---|---|
| 2,637,017 | Holden | Apr. 28, 1953 |
| 2,743,316 | Mallery | Apr. 24, 1956 |